K. VÖLLER & E. STEINHART.
SPRING COUPLING.
APPLICATION FILED NOV. 9, 1912.
1,091,989.
Patented Mar. 31, 1914.
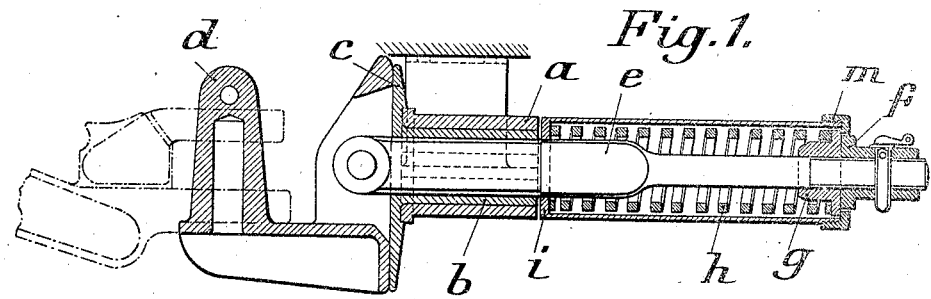
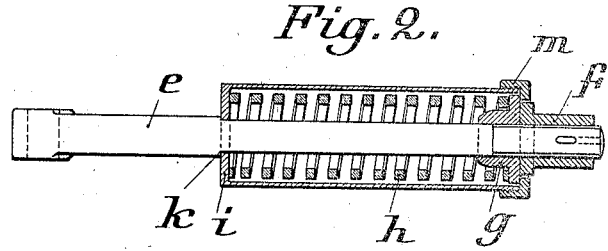
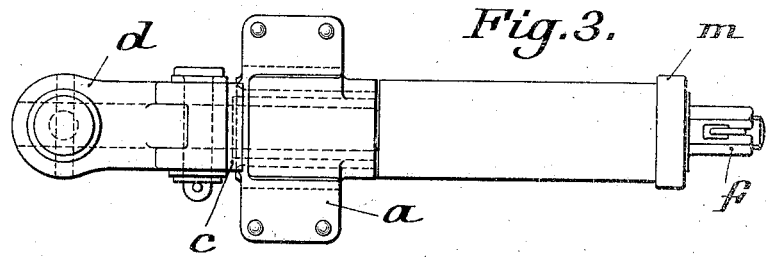
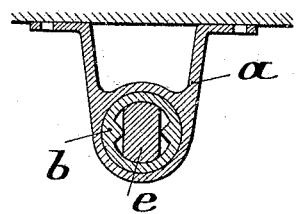
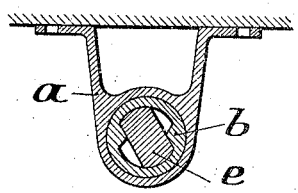
WITNESSES
INVENTORS

UNITED STATES PATENT OFFICE.

KARL VÖLLER AND EUGEN STEINHART, OF DUSSELDORF, GERMANY, ASSIGNORS TO RHEINISCHE METALLWAAREN- UND MASCHINENFABRIK, OF DUSSELDORF-DERENDORF, GERMANY, A CORPORATION OF GERMANY.

SPRING-COUPLING.

1,091,989.      Specification of Letters Patent.     Patented Mar. 31, 1914.

Application filed November 9, 1912. Serial No. 730,436.

*To all whom it may concern:*

Be it known that we, KARL VÖLLER, engineer, a subject of the German Emperor, residing at 12 Scharnhorststrasse, Dusseldorf, Germany, and EUGEN STEINHART, engineer, a subject of the German Emperor, residing at 81 Schlossstrasse, Dusseldorf, Germany, have invented certain new and useful Improvements in Spring-Couplings; and we do hereby declare the following to be a full, clear, and exact description of the invention, such as will enable others skilled in the art to which it appertains to make and use the same.

In couplings for vehicles, but more especially for limbers and guns, it is usual to provide one member of the coupling for example the limber hook, with a spring and to pivot it to one of the vehicles, either the front or the rear one. The known constructions of this kind have as a rule a longitudinally placed spring so arranged that the pivoted member, for example the limber hook, is drawn with the full force of the spring against a block, whereby this member is prevented from rotating relatively to the vehicle or can only be rotated by application of great force, there being much friction between the limber hook and the block due to the pressure produced by the spring. But the arrangement has the disadvantage that it is very difficult to couple the vehicles. On the other hand when traveling over uneven ground strains developed by the inclination of the two axes are rendered less serious by the very great friction. Other constructions are those in which the coupling member and the block against which it is drawn by the spring have a common pivot in the vehicle. In this manner the coupling can be easily rotated and is therefore easily accessible and easily connected or disconnected, but the heavy strains arising during travel or when the axes of the vehicles are inclined are only slightly reduced, namely solely by the action of the spring.

According to the present invention the advantages of these different constructions are combined while the disadvantages are eliminated.

In the accompanying drawing, Figure 1 is a vertical longitudinal sectional view. Fig. 2 is a similar view of the spring and its casing, with the draw-bar at right angles to the position shown in Fig. 1. Fig. 3 is a plan view. Figs. 4 and 5 are cross sectional views.

On the wagon—either rear or front—carrying the spring coupling, the hollow bearing $a$ is rigidly fixed and is provided with a bush $b$ having at one end a large flange $c$ against which the actual coupling member bears, in this case the limber hook $d$.

Within the bush $b$ there is a draw bar $e$ which is pivoted to the limber hook $d$. This bar can rotate on its axis within the bush $b$ but only to a limited extent, as shown in Figs. 4 and 5. At its free end the bar $e$ carries a fixed collar $f$, which receives the prism of the spring $h$ through the intermediate disk $g$. The other end of the spring bears against the disk $i$ forming the end piece of the casing of the spring and resting against shoulder $k$ on the bar $e$. The position of this shoulder $k$ is such that it is distant from the face of the limber hook which bears against the flange $c$, by rather more than the length of the bush $b$. In the normal position the spring $h$ is compressed between the two disks $g$ and $i$ and exerts its force on the limber hook. During travel, however, the amount of play between the disk $i$ and the bush $b$ or the bearing $a$ is taken up and the spring $h$ comes into operation as soon as the limber hook is lifted owing to a shock between the coupled vehicles. The play between the disk $i$ and the bearing $a$ is practically so small that it only permits easy rotation of the bar $e$ in the bush $b$.

In the example shown the abutment (disk $i$) for the spring is the end of a casing extending over the second abutment (disk $g$). At the open end of this casing there is a screw cap $m$, having an inwardly projecting flange forming a stop for the disk $g$. The shoulder $k$ can however be dispensed with if the position of the collar $f$ on the bar is so selected that when set up the bar $e$ has a small amount of longitudinal play. In this manner also the easy rotation of the bar in bush $b$ may be secured.

The arrangement last described has the advantage that the spring is protected by the casing against damages and moistening. Further it is possible to carry the spring within the casing on the vehicle and to tension it easily whether or not the spring may be in position for use. This is different from the constructions of couplings for vehicles hitherto known in which the spring must be tensioned on the rod arranged within the limber arm. This necessitated much time and was very difficult as there was no good access to the spring on account of its being situated below the limber and the key for turning the tensioning screw could not be well manipulated. According to our present invention however in which the spring is arranged within a casing having a fixed abutment and a second displaceable abutment the spring can be tensioned when not in use by means of a tensioning pin, whereupon the casing may be shifted and fastened on to the rod. Therefore the spring can be very readily interchanged in case of its being broken.

As already mentioned, when the vehicle is at rest, owing to the small amount of play between the rotating parts, the limber hook can be easily returned and the two vehicles readily coupled. During travel the spring is pressed against the bearing $a$ through the disk with a pressure which is only equal to the draft, as long as the ground is level. On uneven ground the longitudinal axes of the vehicles are practically always at an angle to each other and the limber hook is inclined either upward or downward relatively to the flange $c$ of the bush $b$. The limber hook being urged by the pressure of the spring $h$, which is greater than the draft, against the flange $c$, if the axes of the vehicles assume an angle to each other, rotation of the vehicles relatively to each other about the horizontal axis does not occur in jerks, but the friction between the flange $c$ and the limber hook $d$ produces a gradual transition from one position to the other.

We claim as our invention:

1. A coupling for vehicles comprising a member capable of rotating about a horizontal axis, a spring acting longitudinally on said member, a casing mounted on said member and inclosing said spring, said casing having at its opposite ends members forming abutments for the spring, one of said members being slidable in said casing, means for limiting the movement of the last mentioned abutment under the recoil of the spring, and means for holding the casing on the coupling member.

2. A coupling for vehicles comprising a member capable of rotating about a horizontal axis, a spring acting longitudinally on said member, a casing mounted on said member and inclosing said spring, said casing having at its opposite ends members forming abutments for the spring, one of said members being slidable in said casing, an end piece removably mounted on said casing, and forming a stop for the last mentioned abutment under the recoil of the spring, and means mounted on the coupling member for holding the casing thereon.

3. A coupling for vehicles comprising a member capable of rotating about a horizontal axis, a spring acting longitudinally on said member, a casing mounted on said member and inclosing said spring, said casing having at its opposite ends members forming abutments for the spring, one of said members being slidable in said casing, an end piece adjustably mounted on said casing and forming a stop for the last mentioned abutment under the recoil of the spring, and means mounted on the coupling member for holding the casing thereon.

In testimony whereof, we have signed this specification in the presence of two subscribing witnesses.

KARL VÖLLER.
EUGEN STEINHART. [L S.]

Witnesses as to Karl Völler:
HENRY HASPER,
WOLDEMAR HAUPT.
Witnesses as to Eugen Steinhart:
HELEN NUFER,
ALBERT NUFER.